US 11,099,326 B2

(12) United States Patent
Kanno

(10) Patent No.: US 11,099,326 B2
(45) Date of Patent: Aug. 24, 2021

(54) OPTICAL FIBER ARRAY, FIBER FIXING SUBSTRATE, AND METHOD FOR MANUFACTURING OPTICAL FIBER ARRAY

(71) Applicant: FUJIKURA LTD., Tokyo (JP)

(72) Inventor: Shuhei Kanno, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 17/043,458

(22) PCT Filed: Jan. 18, 2019

(86) PCT No.: PCT/JP2019/001513
§ 371 (c)(1),
(2) Date: Sep. 29, 2020

(87) PCT Pub. No.: WO2019/215959
PCT Pub. Date: Nov. 14, 2019

(65) Prior Publication Data
US 2021/0026072 A1 Jan. 28, 2021

(30) Foreign Application Priority Data
May 9, 2018 (JP) .............................. JP2018-090531

(51) Int. Cl.
*G02B 6/255* (2006.01)
*G02B 6/36* (2006.01)
(52) U.S. Cl.
CPC ........... *G02B 6/255* (2013.01); *G02B 6/2558* (2013.01); *G02B 6/3636* (2013.01); *G02B 6/2551* (2013.01)

(58) Field of Classification Search
CPC .... G02B 6/255; G02B 6/2551; G02B 6/2558; G02B 6/3636
See application file for complete search history.

(56) References Cited

U.S. PATENT DOCUMENTS

| 5,422,974 | A | 6/1995 | Brown et al. |
| 5,499,314 | A | 3/1996 | Leite et al. |
| 7,021,842 | B2 * | 4/2006 | Yamada ............... G02B 6/3636 385/136 |
| 7,587,108 | B2 * | 9/2009 | Carpenter ............... G02B 6/30 385/137 |
| 10,663,665 | B2 * | 5/2020 | Blazer .................. G02B 6/2551 |
| 2017/0038551 | A1 | 2/2017 | Segsworth et al. |

FOREIGN PATENT DOCUMENTS

| JP | H08036113 A | 2/1996 |
| JP | H11316314 A | 11/1999 |
| JP | 2001059916 A | 3/2001 |

(Continued)

*Primary Examiner* — Ryan A Lepisto
(74) *Attorney, Agent, or Firm* — Osha Bergman Watanabe & Burton LLP

(57) ABSTRACT

An optical fiber array includes: optical fibers that each include a fusion part; and a substrate on which fiber grooves are formed along a longitudinal direction of the optical fibers. The optical fibers are aligned in a width direction of the optical fibers. The fiber grooves are aligned in the width direction. The fusion parts are disposed on the substrate. The fusion parts of two adjacent optical fibers are disposed in different positions from each other in the longitudinal direction.

10 Claims, 7 Drawing Sheets

(56) References Cited

FOREIGN PATENT DOCUMENTS

| | | | | |
|---|---|---|---|---|
| JP | 2001337248 A | | 12/2001 | |
| JP | 2002243986 A | | 8/2002 | |
| JP | 2003156662 A | * | 5/2003 | |
| JP | 2003156662 A | | 5/2003 | |
| JP | 2003241020 A | | 8/2003 | |
| JP | 2003294971 A | | 10/2003 | |
| JP | 2004126563 A | | 4/2004 | |
| JP | 2005148616 A | | 6/2005 | |
| JP | 2017068220 A | | 4/2017 | |
| JP | 2017173512 A | | 9/2017 | |
| JP | 2018109695 A | | 7/2018 | |
| JP | 2018146722 A | | 9/2018 | |
| WO | WO-2018127992 A1 | * | 7/2018 | ............... G02B 6/40 |

* cited by examiner

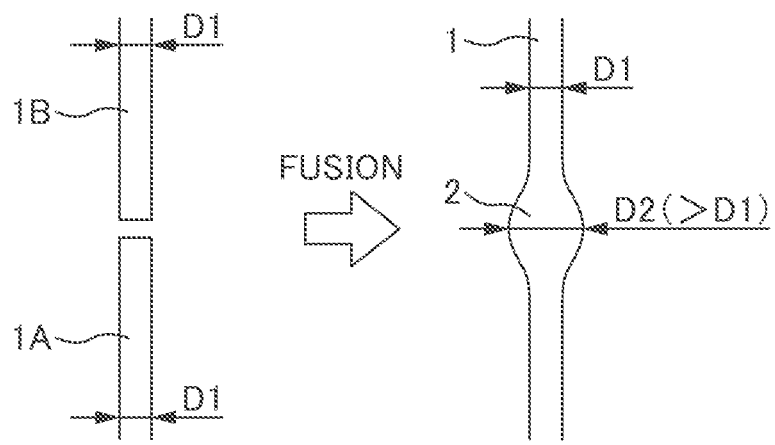
FIG. 6A
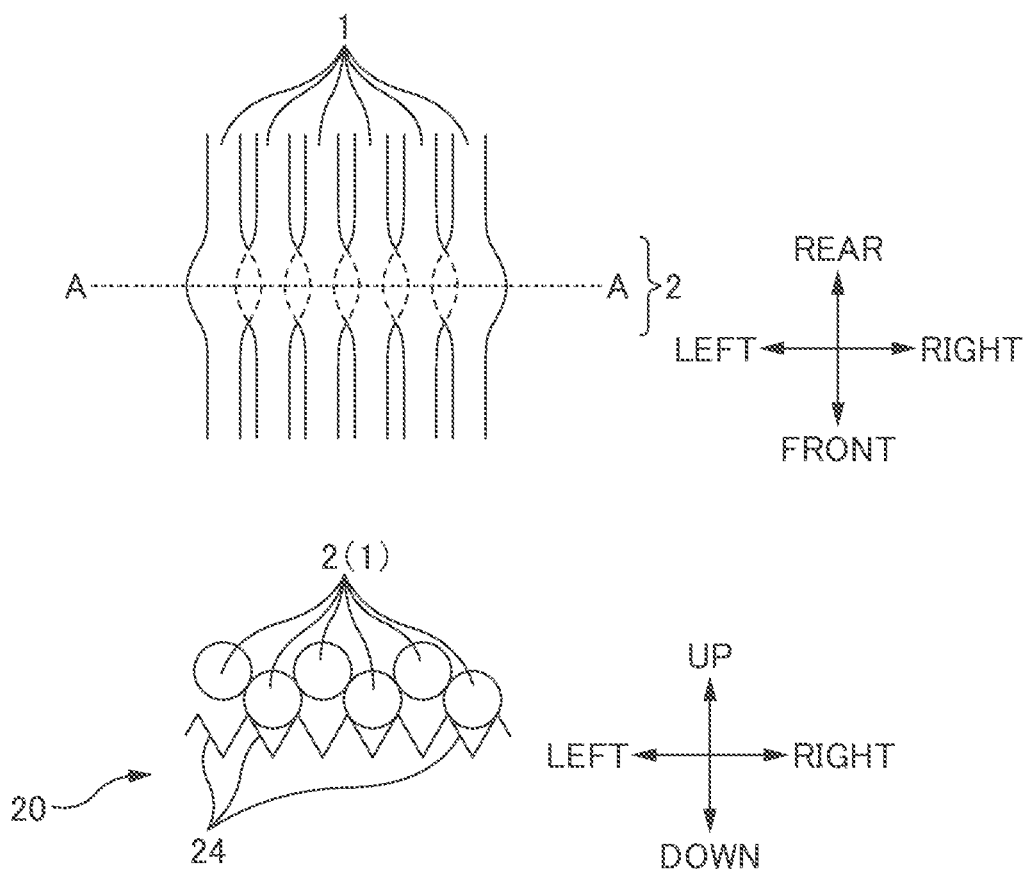
FIG. 6B (COMPARISON EXAMPLE)

OPTICAL FIBER ARRAY, FIBER FIXING SUBSTRATE, AND METHOD FOR MANUFACTURING OPTICAL FIBER ARRAY

TECHNICAL FIELD

The present invention relates to an optical fiber array, a fiber fixing substrate, and a method for manufacturing an optical fiber array.

BACKGROUND

An optical fiber has been widely used as a coupling element that couples an optical transmission path in optical communication, and has been applied to a light guide splitter, an optical switch, and the like. The optical fiber array has a structure in which optical fibers are placed in a plurality of fiber grooves formed on a substrate, and a fixing member sandwiches the optical fibers from above, and thus presses and fixes the optical fibers. Thus, the plurality of optical fibers placed in the fiber grooves formed on the substrate can achieve extremely high-density and highly precise alignment.

As such an optical fiber array, for example, Patent Literature 1 discloses that an optical fiber including a fusion part being formed by fusion-splicing two optical fibers together constitutes an optical fiber array. In such fusion-spliced optical fibers, optical fibers each having a different core diameter are spliced together by TEC fusion, such as splicing between a high NA fiber and a single-mode fiber, for example. Moreover, when the optical fibers are spliced together by TEC fusion, an outer diameter of the fusion part may increase (expand) further than an outer diameter of each of the optical fibers. In the optical fiber array described in Patent Literature 1, a part of the optical fiber including the fusion part is placed in a fiber groove formed on a substrate, and is fixed by a fixing member.

PATENT LITERATURE

Patent Literature 1: JP 2003-156662A

When a plurality of optical fibers are placed on a substrate at a high density, an interval between adjacent optical fibers is also reduced. In the optical fiber array described in Patent Literature 1, positions of the fusion parts in a longitudinal direction of the optical fiber are common in all of the optical fibers placed in the plurality of fiber grooves formed on the substrate. At this time, the expanding fusion parts of adjacent optical fibers interfere with each other, and the optical fiber is not properly placed in the fiber groove. Thus, highly precise alignment of the plurality of optical fibers cannot be achieved in some cases.

SUMMARY

One or more embodiments of the present invention suppress, when a plurality of optical fibers including fusion parts are placed on a substrate, interference between the fusion parts of adjacent optical fibers.

Some embodiments of the present invention are an optical fiber array comprising:
 a plurality of optical fibers that each include a fusion part, the plurality of the optical fibers being aligned in a width direction; and
 a substrate in which a plurality of fiber grooves formed along a longitudinal direction of the optical fibers are aligned in the width direction, wherein
 the fusion parts of the plurality of the optical fibers are placed on the substrate in a state where the fusion parts of two adjacent optical fibers are located in different positions from each other in the longitudinal direction.

Other features of the invention are made clear by the following description and the drawings.

According to some embodiments of the present invention, when a plurality of optical fibers including fusion parts are placed on a substrate, interference between the fusion parts of adjacent optical fibers can be suppressed.

BRIEF DESCRIPTION OF THE DRAWINGS

FIG. 6A is an explanatory diagram illustrating a situation of a fusion part 2 of the fusion optical fiber 1. FIG. 6B is a diagram illustrating a situation where the plurality of fusion optical fibers 1 are placed on the substrate 20 according to a comparison example.

DETAILED DESCRIPTION

Figure 1A:
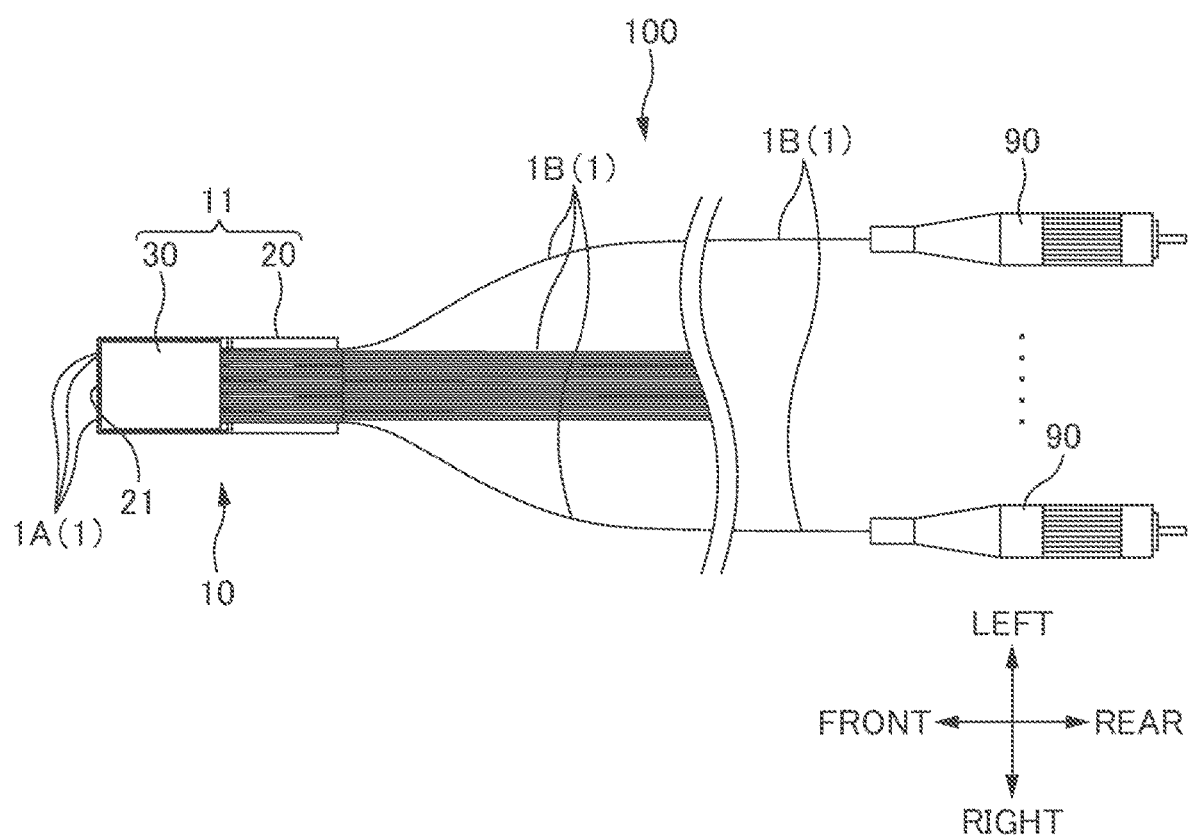
FIG. 1A is a schematic diagram of an optical fiber array 10 according to one or more embodiments.

At least the following matters are made clear from the following description and the drawings.

Disclosed is an optical fiber array comprising: a plurality of optical fibers that each include a fusion part, the plurality of the optical fibers being aligned in a width direction; and a substrate in which a plurality of fiber grooves formed along a longitudinal direction of the optical fibers are aligned in the width direction, wherein the fusion parts of the plurality of the optical fibers are placed on the substrate in a state where the fusion parts of two adjacent optical fibers are located in different positions from each other in the longitudinal direction. With such an optical fiber array, when the plurality of optical fibers including the fusion parts are placed on the substrate, interference between the fusion parts of adjacent optical fibers can be suppressed.

In one or more embodiments, the fiber array further comprises a fixing member that sandwiches the plurality of the optical fibers placed in the fiber grooves between the substrate and the fixing member. In this way, the optical fiber placed on the substrate can be fixed.

The substrate includes a clearance part that is formed in a position of the fusion parts, the clearance part having a recessed shape. In this way, when the plurality of optical fibers including the fusion parts that expand further than an outer diameter of the optical fiber are placed on the substrate, an expanding part of the fusion part can escape in the recessed part.

The clearance part includes a first clearance part, and a second clearance part located in a position in the longitudinal direction different from a position of the first clearance part, and the plurality of the fiber grooves are formed between the first clearance part and the second clearance part. In this way, when the plurality of optical fibers including the fusion parts that expand further than an outer diameter of the optical fibers are placed on the substrate, interference between the fusion parts of adjacent optical fibers can be suppressed.

The plurality of the optical fibers are placed on the substrate such that positions of the fusion parts in the longitudinal direction are staggered. In this way, when the plurality of optical fibers including the fusion parts that expand further than an outer diameter of the optical fibers are placed on the substrate, interference between the fusion parts of adjacent optical fibers can be suppressed.

Disclosed is fiber faxing substrate comprising: a plurality of fiber grooves, formed along a longitudinal direction of an optical fiber, being aligned in a width direction; a first clearance part that is formed in a position of a fusion part of the optical fiber disposed in the fiber groove, the first clearance part having a recessed shape; and a second clearance part formed in a position of a fusion part of the optical fiber disposed in the fiber groove, the second clearance part being formed in a position in the longitudinal direction different from a position of the first clearance part. According to such a fiber fixing substrate, when the plurality of optical fibers including the fusion parts are placed on the substrate, interference between the fusion parts of adjacent optical fibers can be suppressed.

Disclosed is a method for manufacturing an optical fiber array, comprising: aligning a plurality of optical fibers each including a fusion part in a width direction of the optical fibers; preparing a substrate in which a plurality of fiber grooves formed along a longitudinal direction of the optical fibers are aligned in the width direction; and placing the fusion parts of the plurality of the optical fibers on the substrate in a state where the fusion parts of two adjacent optical fibers are located in different positions from each other in the longitudinal direction. According to such a method for manufacturing an optical fiber array, when the plurality of optical fibers including the fusion parts are placed on the substrate, interference between the fusion parts of adjacent optical fibers can be suppressed.

In one or more embodiments, the method for manufacturing an optical fiber array further comprises alternately placing, in the fiber grooves, the plurality of the optical fibers in which the fusion parts have a common position in the longitudinal direction, and then placing, in the remaining fiber grooves, the plurality of the optical fibers in which the fusion parts have another common position in the longitudinal direction. In this way, the optical fibers can be easily placed on the substrate in the state where the fusion parts of two adjacent optical fibers are located in different positions from each other in the longitudinal direction.

Figure 1B:
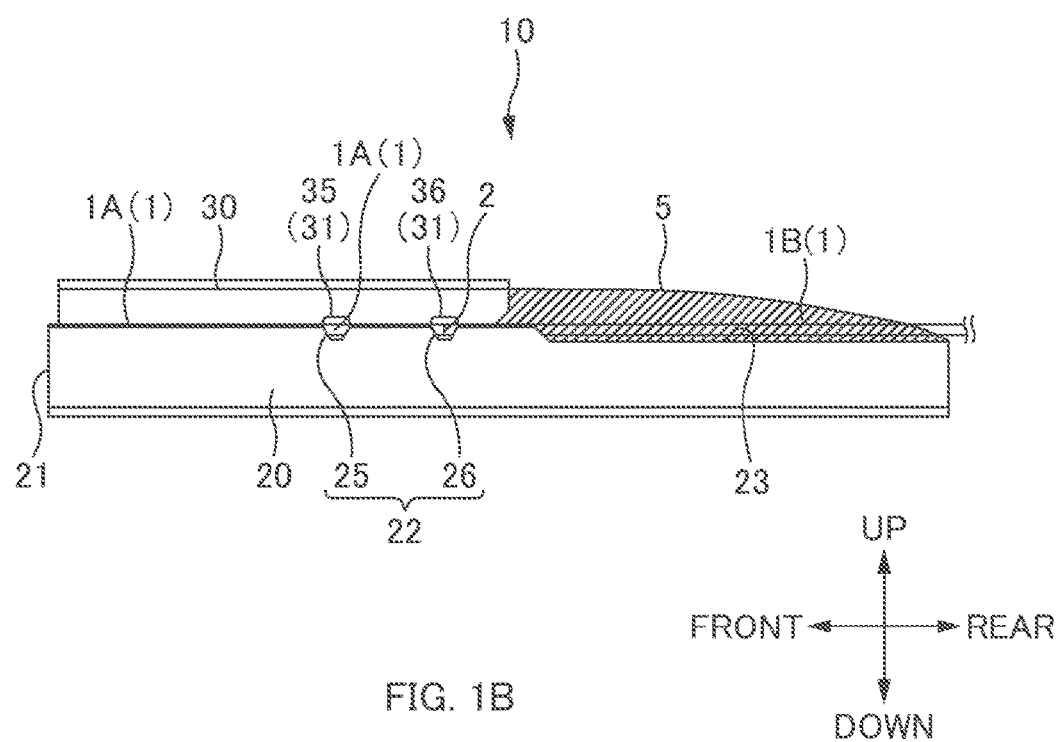
FIG. 1B is a cross-sectional view of the optical fiber array 10 according to one or more embodiments.
Figure 2:
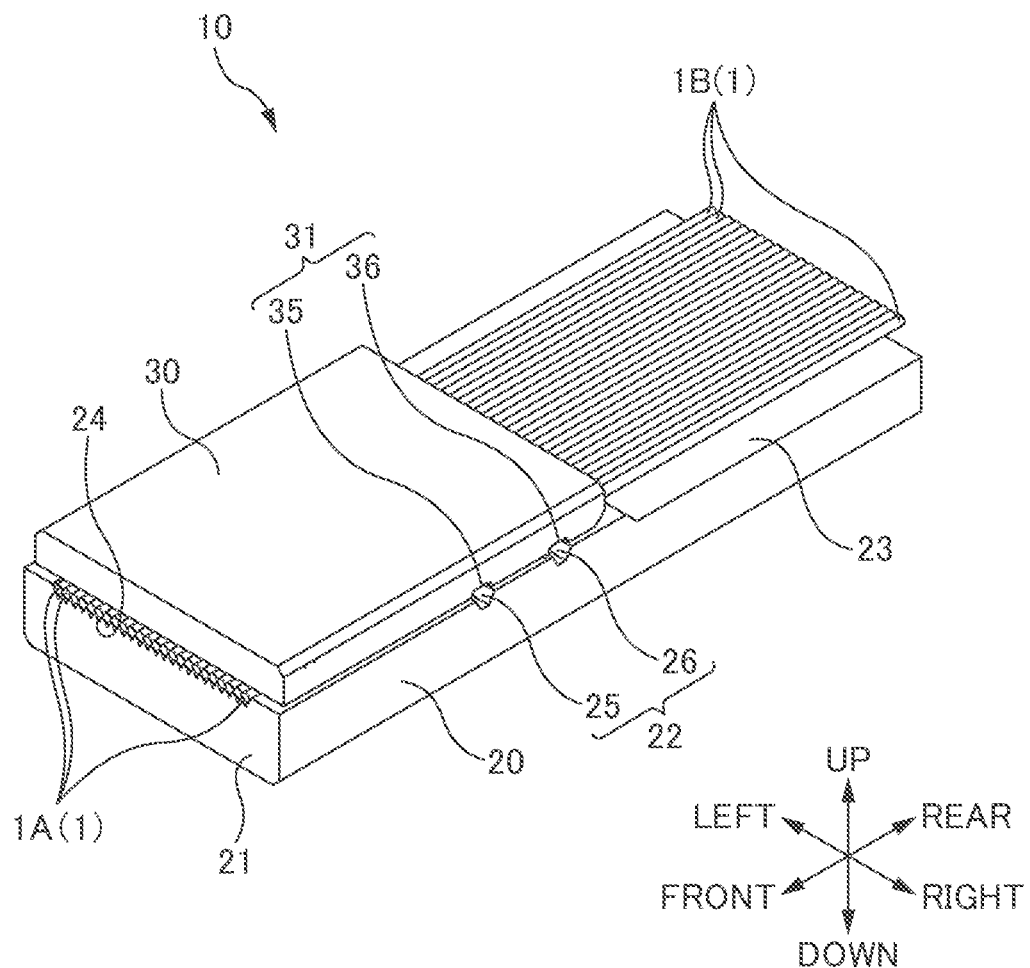
FIG. 2 is an overall perspective view of the optical fiber array 10 according to one or more embodiments.

Outline of Optical Fiber Array 10:

FIG. 1A is a schematic diagram, of an optical fiber array unit 100 according to one or more embodiments. FIG. 1B is a cross-sectional view of an optical fiber array 10 according to one or more embodiments. FIG. 2 is an overall perspective view of the optical fiber array 10 according to one or more embodiments.

In the following description, directions will be defined as illustrated in the drawings. Specifically, a longitudinal direction of a fusion optical fiber 1 placed on a substrate 20 is a "front-rear direction", a side of a substrate endface 21 of the substrate 20 is the "front", and an opposite side is the "rear". A width direction of the fusion optical fiber 1 placed on the substrate 20 is a "left-right direction", a right side when viewed from the front is the "right", and an opposite side (left side) is the "left". A direction orthogonal to the "front-rear direction" and the "left-right direction" is an "up-down direction", a side of a fixing member 30 with respect to the substrate 20 is "up", and an opposite side is "down".

The optical fiber array unit 100 includes the optical fiber array 10 and a plurality of optical connectors 90. The optical fiber array 10 is provided in end parts on the front side of the plurality of optical fibers. The optical connector 90 is provided in an end part on the rear side of each of the plurality of optical fibers. In other words, the optical connector 90 is provided in the end part on the rear side of each of the plurality of fusion optical fibers 1 included in the optical fiber array 10. The optical fiber array 10 is a ng element that couples an optical transmission path. As illustrated in FIG. 2, in a front part of the optical fiber array 10, the end parts on the front side of the plurality of fusion optical fibers 1 are held so as to be located on the substrate endface 21 of the substrate 20. The front part of the optical fiber array 10 is connected to a silicon chip (not illustrated) such as an optical transceiver, for example. As illustrated in FIG. 1A, the optical connector 90 is provided in an end part on the rear side of the optical fiber array unit 100, and an optical connection with various apparatuses is in a removable state. The optical connector 90 is, for example, an FC connector. However, the optical connector 90 may be an optical connector other than the FC connector.

Figure 3:
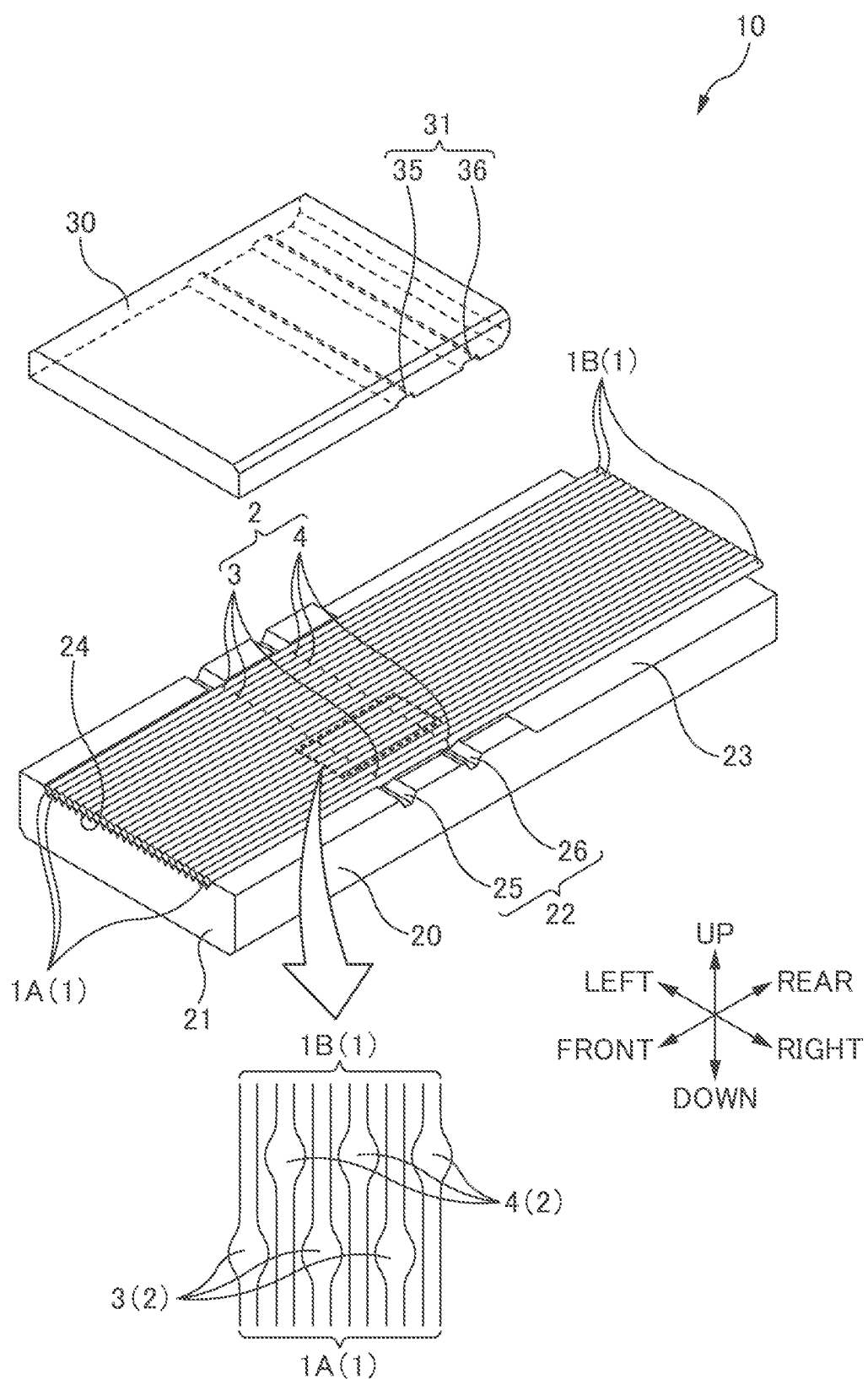
FIG. 3 is an exploded perspective view of a state where a fixing member 30 is removed from the optical fiber array 10 according to one or more embodiments.
Figure 4:
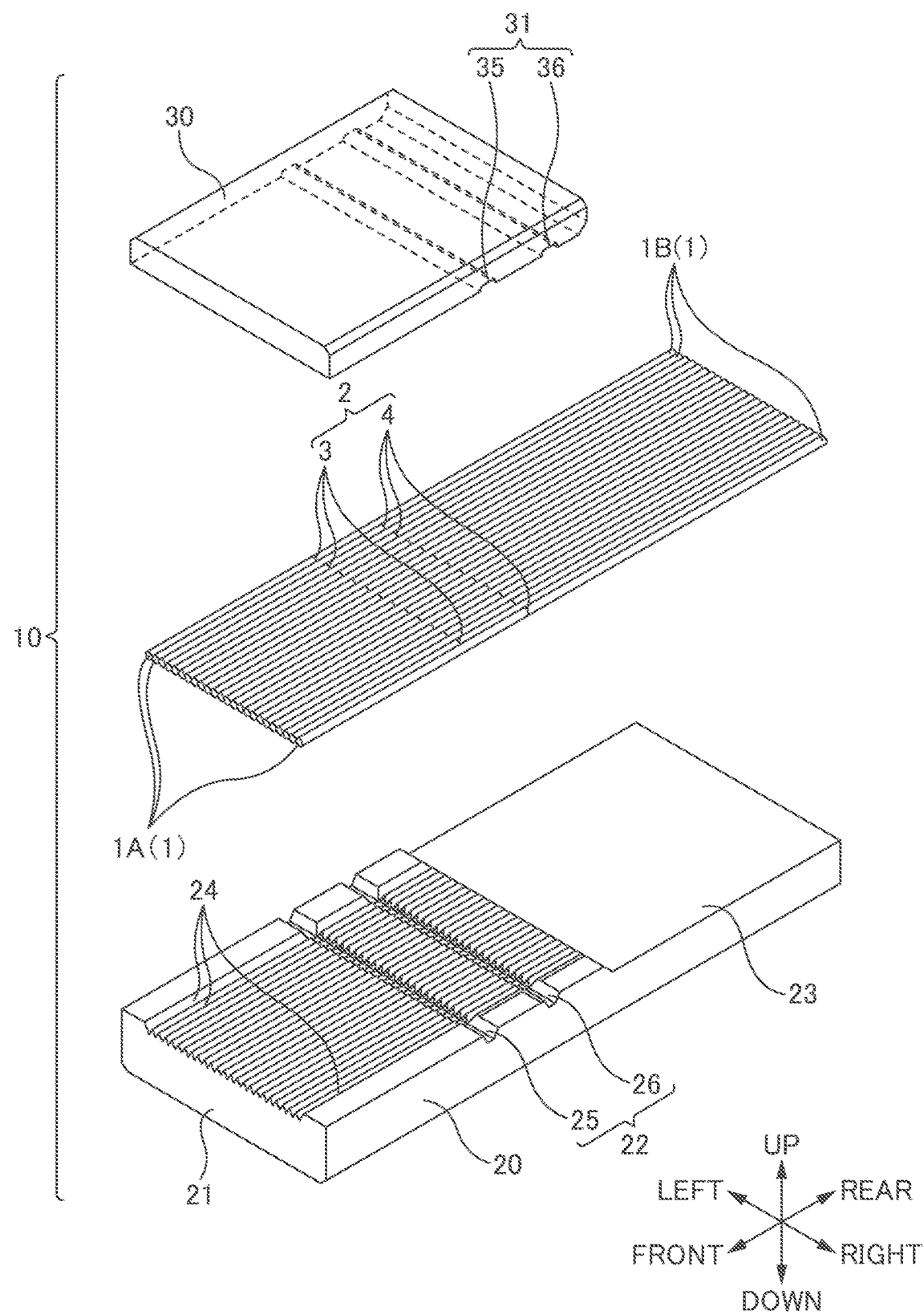
FIG. 4 is an exploded perspective view of a state where the fixing member 30 and fusion optical fibers 1 are removed from the optical fiber array 10 according to one or more embodiments.
Figure 5:
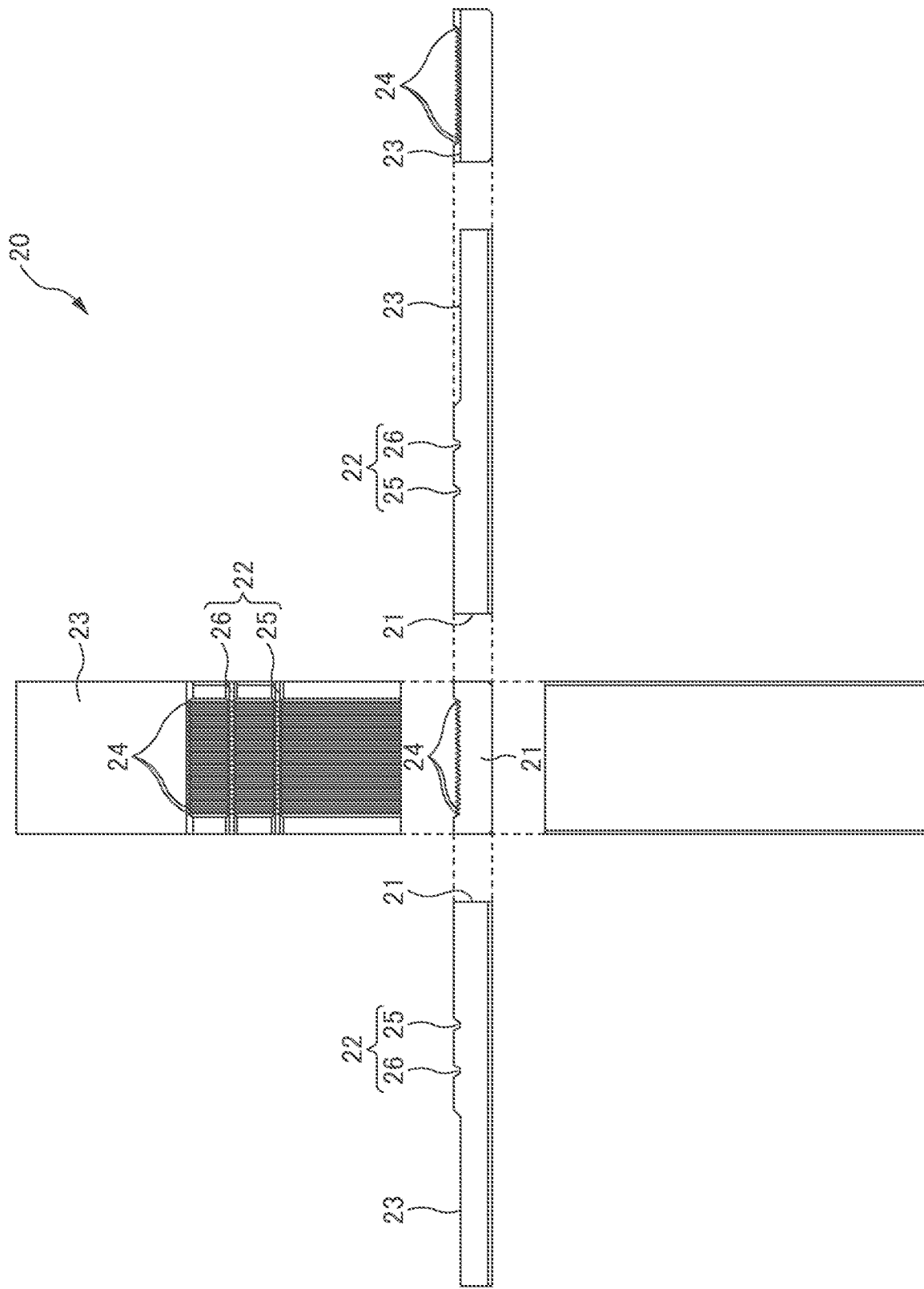
FIG. 5 is a hexagonal view of a substrate 20 in the optical fiber array 10 according to one or more embodiments.

Detailed Configuration of Optical Fiber Array 10:

FIG. 3 is an exploded perspective view of a state where the fixing member 30 is removed from the optical fiber array 10 according to one or more embodiments. FIG. 4 is an exploded perspective view of a state where the fixing member 30 and the fusion optical fiber 1 are removed from the optical fiber array 10 according to one or more embodiments. FIG. 5 is a hexagonal view of the substrate 20 in the optical fiber array 10 according to one or more embodiments. FIG. 6A is an explanatory diagram illustrating a situation of a fusion part 2 of the fusion optical fiber 1. Note that a lower diagram indicated by an arrow in FIG. 3 is a diagram when a region indicated by a broken line in FIG. 3 is viewed from an upper side.

The optical fiber array 10 includes the fusion optical fibers 1, the substrate 20, and the fixing member 30. Note that the fusion optical fibers 1, the substrate 20, and the fixing member 30 are bonded together with an adhesive 5 (see FIG. 1B)

Each fusion optical fiber 1 is an optical fiber acquired by splicing two optical fibers together by fusion. As illustrated in FIGS. 3 and 4, the fusion optical fiber 1 according to one or more embodiments is acquired by splicing a thin core optical fiber 1A on the substrate endface 21 side and a normal core optical fiber 1B on the optical connector 90 side together by fusion. Note that, hereinafter, the fusion optical fiber 1 may be simply referred to as an "optical fiber". As illustrated in FIGS. 3 and 4, the optical fiber array 10 includes the plurality of (herein, 24) fusion optical fibers 1. The 24 fusion optical fibers 1 are aligned in the left-right direction (width direction of the fusion optical fiber 1) on the substrate 20. However, the number and an alignment direction of the fusion optical fibers 1 are not limited thereto. Each of the fusion optical fibers 1 is placed in a fiber groove 24 (described below)) formed on the substrate 20, and the fixing member 30 sandwiches the fusion optical fibers 1 from above, and thus the fusion optical fibers 1 are pressed and fixed.

In the optical fiber array 10 according to one or more embodiments, the plurality of fusion optical fibers 1 each include the fusion part 2. The fusion part 2 is a part in which the thin core optical fiber 1A on the substrate endface 21 side and the normal core optical fiber 1B on the optical connector 90 side are fusion-spliced together. As illustrated in FIG. 1B, the fusion part 2 is sandwiched between the substrate 20 and the fixing member 30 in one or more embodiments. Note that the fusion part 2 is housed in a space formed by a substrate side-clearance part 22 included in the substrate 20 and a fixing member side-clearance part 31 included in the fixing member 30 (described below).

In the optical fiber array 10 according to one or more embodiments, a thin core optical fiber such as a high NA fiber is used for the thin core optical fiber 1A. An optical fiber such as a single-mode optical fiber is used for the normal core optical fiber 1B. Note that a core diameter (for example, 6 μm) of the thin core optical fiber 1A is smaller than a core diameter (for example, 9 μm) of the normal core optical fiber 1B. Thus, the fusion optical fiber 1 is acquired by splicing optical fibers (the thin core optical fiber 1A and the normal core optical fiber 1B) having core diameters different from each other together by TEC fusion. Note that TEC fusion is a fusion technique when optical fibers having core diameters different from each other are fusion-spliced together.

A left drawing in FIG. 6A illustrates a situation before the thin core optical fiber 1A and the normal core optical fiber 1B are spliced together by TEC fusion. A right drawing in FIG. 6A illustrates a situation after the thin core optical fiber 1A and the normal core optical fiber 1 are spliced together by TEC fusion, and the fusion optical fiber 1 including the fusion part 2 is formed.

In TEC fusion, a core diameter of an optical fiber is diffused by applying heat processing, thereby performing processing such that a core diameter of one of optical fibers (the thin core optical fiber 1A) gradually matches a core diameter of the other optical fiber (for example, the normal core optical fiber 1B). At this time, an outer diameter of a fusion part may expand further than the outer diameters of the optical fibers before fusion splicing. The fusion optical fiber 1 illustrated in the right drawing in FIG. 6A includes the fusion part 2 expanding further than the outer diameters of the optical fibers before the fusion splicing. In other words, an outer diameter (D2) of the fusion part 2 is greater than an outer diameter (D1) of the thin core optical fiber 1A and the normal core optical fiber 1B by splicing the thin core optical fiber 1A and the normal core optical fiber 1B together by TEC fusion (D2>D1), Note that the outer diameter of the fusion part 2 refers to a length of a part in which the fusion part 2 expands the most from the center of the fusion optical fiber 1. The above described core diameter may be defined by a mode field diameter. Note that FIG. 6A emphasizes and illustrates a thickness of the outer diameter D2 of the fusion part 2. For example, while the outer diameter D1 of the optical fibers (the thin core optical fiber 1A and the normal core optical fiber 1B) other than the fusion part 2 is 125 μm, the outer diameter D2 of the fusion part 2 is about 127 μm to 129 μm.

As illustrated in a lower drawing in FIG. 3, in the optical fiber array 10 according to one or more embodiments, the fusion parts 2 of the plurality of fusion optical fibers 1 are placed on the substrate 20 in a state where the fusion parts 2 of two adjacent fusion optical fibers 1 are located in different positions from each other in the front-rear direction (longitudinal direction of the fusion optical fiber 1). In other words, the plurality of fusion optical fibers 1 are placed on the substrate 20 such that positions of the fusion parts 2 in the front-rear direction (longitudinal direction of the fusion optical fiber 1) are staggered. In this way, when the plurality of fusion optical fibers 1 including the fusion parts 2 that expand further than the outer diameter of the optical fibers before fusion splicing are placed on the substrate 20, interference between the fusion parts 2 of adjacent fusion optical fibers 1 can be suppressed.

In the following description, as illustrated in FIGS. 3 and 4, the fusion part 2 located on the substrate endface 21 side (front side) may be referred to as a first fusion part 3. On the other hand, the fusion part 2 located on the optical connector 90 side (rear side) may be referred to as a second fusion part 4. The first fusion part 3 and the second fusion part 4 are located in different positions from each other in the front-rear direction (longitudinal direction of the fusion optical fiber 1). As illustrated in FIGS. 3 and 4, in the optical fiber array 10 according to one or more embodiments, the fusion parts 2 of two adjacent fusion optical fibers 1 are located in different positions from each other in the front-rear direction. In other words, one of the fusion parts 2 of two adjacent fusion optical fibers 1 is the first fusion part 3, and the other is the second fusion part 4. As illustrated in FIGS. 3 and 4, when the plurality of fusion optical fibers 1 aligned on the substrate 20 are viewed an order from the left direction to the right direction, the fusion optical fiber 1 including the first fusion part 3, the fusion optical fiber 1 including the second fusion part 4, the fusion optical fiber 1 including the first fusion part 3, and the fusion optical fiber 1 including the second fusion part 4 are aligned in order. In other words, while the fusion part 2 of the odd-numbered fusion optical fiber 1 from the left is the first fusion part 3 (while the odd-numbered fusion optical fiber 1 includes the first fusion part 3), the fusion part 2 of the even-numbered fusion optical fiber 1 is the second fusion part 4 (the even-numbered fusion optical fiber 1 includes the second fusion part 4).

The substrate 20 is a member that holds the fusion optical fiber 1 on a lower side. The fusion optical fiber 1 is placed on the substrate 20, and is thus held on the substrate 20. Note that the fusion optical fiber 1 placed on the substrate 20 is sandwiched between the fixing member 30 and the substrate 20. The substrate 20 according to one or more embodiments is made of glass. However, the substrate 20 may be made of another material.

The substrate 20 includes the fiber grooves 24, the substrate endface 21, the substrate side-clearance part 22, and a terrace part 23.

The fiber grooves 24 constitute a part in which the fusion optical fibers 1 are placed. The fiber grooves 24 are formed on an upper surface of the substrate 20 as V-shaped grooves along the front-rear direction (longitudinal direction of the fusion optical fiber 1). The plurality of fiber grooves 24 are aligned on the upper surface of the substrate 20 in the left right direction (width direction of the fusion optical fibers 1). As described above, the optical fiber array 10 according to one or more embodiments includes the 24 fusion optical fibers Since each one fusion optical fiber 1 is placed in the fiber groove 24, the 24 fiber grooves 24 are also aligned in the upper surface of the substrate 20 in the left-right direction. When the fusion optical fiber 1 is placed in the fiber groove 24, the fusion optical fiber 1 abuts two inclined surfaces that form the V-shaped groove. Therefore, the fusion optical fiber 1 is placed in the fiber groove 24, and thus the fusion optical fiber 1 is positioned in the up-down direction and the left-right direction. Then, the plurality of fusion optical fibers 1 are each placed in the fiber groove 24, and are thus aligned with high precision. Note that an interval between the fiber grooves 24 is 127 μm in one or more embodiments Thus, the outer diameter D2 (see FIG. 6A) of the fusion part 2 may exceed the interval between the fiber grooves 24.

The substrate endface 21 is a part that serves as a connecting end face of the optical fiber array 10. The end part on the front side of the thin core optical fiber 1A (fusion optical fiber 1) is located on the substrate endface 21. The substrate endface 21 is polished so as to have an endface aligned with an endface of the end part on the front side of the thin core optical fiber 1A (fusion optical fiber 1).

The substrate side-clearance part 22 is a part that houses the fusion parts 2 of the fusion optical fibers 1. As described above, each fusion optical fiber 1 has two different outer diameters that are the outer diameter (D1) of the part of the thin core optical fiber 1A and the normal core optical fiber 1B other than the fusion part 2 and the outer diameter (D2) of the fusion part 2 by splicing the thin core optical fiber 1A and the normal core optical fiber 1B together by TEC fusion. Each fiber groove 24 described above is formed based on the outer diameter (D1) of the part of the thin core optical fiber 1A and the normal core optical fiber 1B. If the fusion part 2 (the outer diameter D2) is placed in the fiber groove 24, the fusion optical fiber 1 is placed as in a floating manner due to a difference between the outer diameter (D2) of the fusion part 2 and the outer diameter (D1) of the part of the thin core optical-fiber 1A and the normal core optical fiber 1B. Thus, there is a case where alignment precision of the fusion fibers 1 in the optical fiber array 10 is reduced by placing the fusion parts 2 of the fusion optical fibers 1 in the fiber groove 24.

Thus, in the optical fiber array 10 according to one or more embodiments, the substrate side-clearance part 22 formed in the substrate 20 lets the fusion parts 2 of the fusion optical fibers 1 escape in the space formed by the substrate side-clearance part 22. The substrate side-clearance part 22 is formed in a recessed shape, and houses the fusion parts 2 of the fusion optical fibers 1 in this recessed space. In this way, contact of the fusion part 2 of the fusion optical fibers 1 with the fiber grooves 24 can be suppressed, and thus the fusion optical fibers 1 being placed in a floating manner from the fiber grooves 24 can be suppressed. Note that the fusion parts 2 of the fusion optical fibers are in non-contact with the substrate 20 (the fiber grooves 24) in the substrate side-clearance part 22 in one or more embodiments. However, even if the fusion parts 2 of the fusion optical fibers 1 contact a bottom surface of the substrate side-clearance part 22, the fusion optical fibers 1 floating from, the fiber grooves 24 can be reduced as compared to a case without the substrate side-clearance part 22. The substrate 20 may not include the substrate side-clearance part 22.

The substrate side-clearance part 22 includes a substrate side-first clearance part 25 and a substrate side-second clearance part 26. The substrate side-first clearance part 25 and the substrate side-second clearance part 26 are formed in positions of the first fusion part 3 and the second fusion part 4 of the fusion optical fiber 1, respectively. In other words, the substrate side-first clearance part 25 and the substrate side-second clearance part 26 are located in different positions from, each other in the front-rear direction (longitudinal direction of the fusion optical fiber 1). Specifically, the substrate side-first clearance part 25 is located on the substrate endface 21 side (front side), and the substrate side-second clearance part 26 is located on the optical connector 90 side (rear side).

As illustrated in FIG. 4, the substrate side-first clearance part 25 and the substrate side-second clearance part 26 are each formed so as to extend in the substrate 20 in the left-right direction. The substrate side-first clearance part 25 and the substrate side-second clearance part 26 are each formed in a recessed groove along the left right direction. Furthermore, a depth of each groove of the substrate side first clearance part 25 and the substrate side-second clearance part 26 is greater than the outer diameter of the fusion part 2. In other words, a depth of each groove of the substrate side-first clearance part 25 and the substrate side-second clearance part 26 is deeper than a depth of the fiber grooves 24 by a height of the expanding part of the fusion part 2. In this way, the part of the fusion parts 2 expanding further than the outer diameter of the fusion optical fibers can escape in the space formed by the substrate side-first clearance part 25 and the substrate side-second clearance part 26 without contacting the fiber grooves 24. Therefore, the alignment precision of the fusion fibers 1 in the optical fiber array 10 can be increased.

In one or more embodiments, the plurality of fiber grooves 24 are also formed between the substrate side-first clearance part and the substrate side-second clearance part 26. In this way, as compared to a case where a large clearance part is formed in the substrate 20 so as to include two clearance parts (the substrate side-first clearance part 25 and the substrate side-second clearance part 26), a space between the substrate 20 and the fixing member 30 can be made smaller, and the amount of the adhesive between the substrate 20 and the fixing member 30 can be reduced. Note that, if the amount of the adhesive between the substrate 20 and the fixing member 30 increases, there is a possibility that a position of the fusion optical fiber 1 may be greatly offset due to contraction of the adhesive during curing. In contrast, in one or more embodiments, since the amount of the adhesive between the substrate 20 and the fixing member 30 can be reduced by forming the plurality of fiber grooves 24 between the substrate side-first clearance part 25 and the substrate side second clearance part 26, a position of the fusion optical fibers 1 can be maintained with high precision.

The terrace part 23 is a part including a surface located below the fiber grooves 24. A sheath part of the normal core optical fiber 1B (fusion optical fiber 1) can escape and be disposed in a space formed by the terrace part 23. However, the substrate 20 may not include the terrace part 23.

The fixing member 30 is a member that holds the fusion optical fibers 1 on the upper side. The fixing member 30 presses the fusion optical fiber 1 held on the substrate 20. As described above, each of the fusion optical fibers 1 abuts the two inclined surfaces that form the V-shaped groove. The fusion optical fiber 1 abuts the fixing member 30, and thus the fusion optical fiber 1 is fixed by a total of three points of the two points of the fiber groove 24 and the one point of the fixing member 30. However, the optical fiber array 10 may not include the fixing member 30.

The fixing member 30 includes the fixing member side-clearance part 31 including a fixing member side-first clearance part 35 and a fixing member side-second clearance part 36. The fixing member side first clearance part 35 and the fixing member side-second clearance part 36 are formed in positions of the first fusion part 3 and the second fusion part 4 of the fusion optical fibers 1, respectively. In other words, the fixing member side first clearance part 35 and the fixing member side-second clearance part 36 are located in different positions from each other in the front-rear direction (longitudinal direction of the fusion optical fiber 1). Similarly, the fixing member side-first clearance part 35 and the fixing member side-second clearance part 36 are formed in positions of the substrate side-first clearance part 25 and the substrate side-second clearance part 26, respectively. Then, as illustrated in FIGS. 3 and 4, the fixing member side-first clearance part 35 and the fixing member side-second clearance part 36 are each formed so as to extend on a lower surface of the fixing member 30 in the left-right direction. The fixing member side first clearance part 35 and the fixing member side second clearance part 36 are each formed in a recessed groove along the left-right direction. However, the fixing member 30 may not include the fixing member side-clearance part 31.

Comparison Example:

FIG. 6B is a diagram illustrating a situation where the plurality of fusion optical fibers are placed on the substrate 20 according to a comparison example. Note that an upper diagram in FIG. 6B illustrates a drawing when the plurality of fusion optical fibers 1 according to the comparison example being placed on the substrate 20 are viewed from the upper side. A lower diagram in FIG. 6B illustrates a cross-sectional view taken along an A-A line in the upper diagram in FIG. 6B.

As described above, the plurality of fusion optical fibers 1 are aligned on the substrate 20 in the left-right direction. Here, when the plurality of fusion optical fibers aligned in the left-right direction are placed on the substrate 20 at a higher density, a greater number of the plurality of fusion optical fibers 1 needs to be aligned on the substrate 20 in the left-right direction. In other words, an interval between adjacent fusion optical fibers 1 is further reduced. Similarly, also for the fiber groove 24 in which each one fusion optical fiber 1 is placed, when the plurality of fusion optical fibers 1 aligned in the left-right direction are placed on the substrate 20 at a higher density, an interval between adjacent fiber grooves 24 is further reduced.

For a higher density of alignment of the fusion optical fibers 1 in the left-right direction, an interval between the fusion optical fibers 1 can also be reduced to the extent to which the thin core optical fibers 1A or the normal core optical fibers 1B almost contact each other. However, as described above, the outer diameter (D2) of the fusion part 2 may expand further than the outer diameter (D1) of the thin core optical fiber 1A and the normal core optical fiber 1B (D2>D1). Thus, when an interval between adjacent fusion optical fibers 1 is reduced, the fusion parts 2 of the adjacent fusion optical fibers 1 may interfere with each other.

As illustrated in the upper diagram in FIG. 6B, the fusion parts 2 of the plurality of fusion optical fibers 1 according to the comparison example all have a common position in the front-rear direction. Thus, when an interval between adjacent fusion optical fibers 1 is reduced, the fusion parts 2 of the adjacent fusion optical fibers 1 interfere with each other, and some of the fusion optical fibers 1 float. As illustrated in the lower diagram in FIG. 6B, the second, fourth, and sixth (hereinafter may be referred to as "even-numbered") fusion optical fibers 1 from the left are placed on the fiber grooves 24 of the substrate 20, but the first, third, and fifth (hereinafter may be referred to as "odd-numbered") fusion optical fibers 1 from the left float and are not properly placed on the fiber grooves 24 of the substrate 20. In other words, the odd-numbered fusion optical fibers 1 are not positioned in the up-down direction and the left-right direction, and are not aligned with high precision.

However, in the optical fiber array 10 according to one or more embodiments, the fusion parts 2 of the plurality of fusion optical fibers 1 are placed on the substrate 20 in a state where the fusion parts 2 of two adjacent fusion optical fibers 1 are located in different positions from each other in the front rear direction (longitudinal direction of the fusion optical fiber 1). In other words, the plurality of fusion optical fibers 1 are placed on the substrate 20 such that positions of the fusion parts 2 in the front-rear direction are staggered. In the order of the alignment of the plurality of fusion optical fibers 1 according to the comparison example illustrated in FIG. 6B, for example, the fusion parts 2 (the first fusion parts 3 described above) of the odd-numbered fusion optical fibers 1 are located on the front side, and the fusion parts 2 (the second fusion parts 4 described above) of the even-numbered fusion optical fibers 1 are located on the rear side in one or more embodiments. In this way, when the plurality of fusion optical fibers 1 including the fusion parts 2 are placed on the substrate 20, interference between the fusion parts 2 of adjacent fusion optical fibers 1 can be suppressed.

Method for Manufacturing Optical Fiber Array 10:

In the method for manufacturing the optical fiber array 10 according to one or more embodiments, first, a sheath of a predetermined part of the thin core optical fiber 1A and the normal core optical fiber 1B is removed. This is because fusion splicing between the optical fibers is normally performed in a state of bare fibers (a state where the optical fibers are not provided with a sheath). Note that a sheath of all parts of the thin core optical fiber 1A and the normal core optical fiber 1B that contact the fiber groove 24 when the fusion optical fiber 1 is placed on the substrate 20 is removed. In this way, a boundary part between the part in which the sheath is removed and the part in which the sheath is present is placed in the fiber groove 24, and thus a decrease in the alignment precision of the fusion optical fiber 1 can be suppressed. The boundary part and the part in which the sheath is present can escape and be disposed in the space formed by the terrace part 23 including the surface located below the fiber groove 24.

Next, the thin core optical fiber 1A and the normal core optical fiber 1B are fusion-spliced together fusion splicing is performed by TEC fusion described above. After fusion splicing, the part of the fusion optical fiber 1 on the substrate endface 21 side (the part of the thin core optical fiber 1A) is cut in a predetermined position. Note that the predetermined position in which the part is cut is determined such that the fusion part 2 is housed in the substrate side-clearance part 22 of the substrate 20 when the fusion optical fiber 1 is placed on the substrate 20. Note that, as described above, the substrate side-clearance part 22 includes the substrate side-first clearance part 25 located on the substrate endface 21 side (front side), and the substrate side-second clearance part 26 located on the optical connector 90 side (rear side). Thus, cutting work is performed on the fusion optical fiber 1 cut in a predetermined position such that the fusion part 2 (the first fusion part 3) is housed in the substrate side-first clearance part 25, and the fusion optical fiber cut in a predetermined position such that the fusion part 2 (the second fusion part 4) is housed in the substrate side-second clearance part 26.

Note that the fusion optical fiber 1 is cut such that the end part on the front side of the fusion optical fiber 1 (the part of the thin core optical fiber 1A) is slightly longer than the position of the substrate endface 21 when the fusion optical fiber 1 is placed on the substrate 20. By cutting the fusion optical fiber 1 with a margin in such a manner, the endfaces of the substrate endface 21 and the front endface of the fusion optical fiber 1 can be polished so as to be aligned with each other in a subsequent step.

Figure 7A:
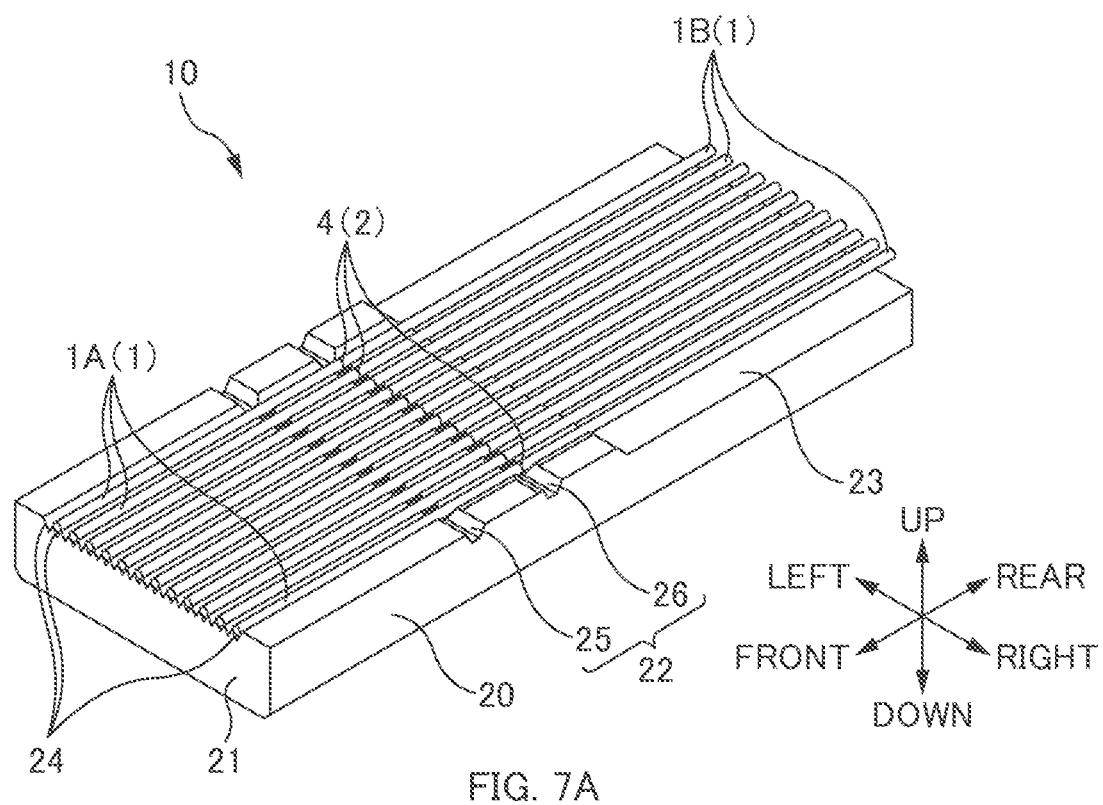
FIGS. 7A and 7B are diagrams illustrating a situation where the fusion optical fiber 1 according to one or more embodiments is placed on the substrate 20.
Figure 7B:
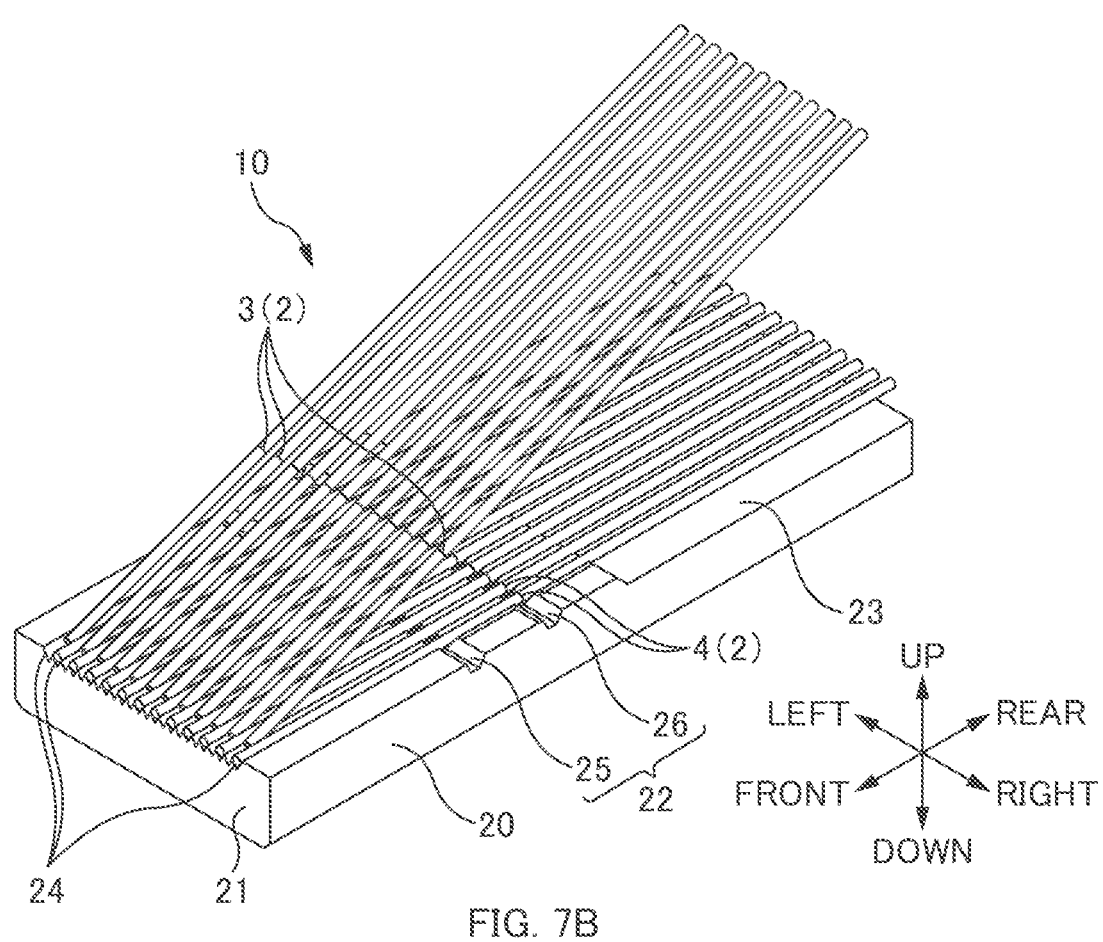

FIGS. 7A and 7B are diagrams illustrating a situation where the fusion optical fiber according to one or more embodiments is placed on the substrate 20.

FIG. 7A illustrates a situation where the plurality of (12) fusion optical fibers 1 in which the fusion parts 2 have a common position in the front-rear direction (longitudinal direction of the fusion optical fiber 1) are alternately placed in the fiber grooves 24. The fusion parts 2 (the second fusion parts 4) of the even-numbered fusion optical fibers described above are commonly located on the rear side. In one or more embodiments, the plurality of fusion optical fibers 1 including the second fusion parts 4 are collectively placed in the fiber grooves 24 in such a manner. At this time, the fusion optical fibers 1 including the second fusion parts 4 are alternately placed in the fiber grooves 24.

After the state illustrated in FIG. 7A, FIG. 7B illustrates a situation where the plurality of (12) fusion optical fibers 1 in which the fusion parts 2 have another common position in the front-rear direction (longitudinal direction of the fusion optical fibers 1), are placed in the remaining fiber grooves 24. The fusion parts 2 (the first fusion parts 3) of the odd-numbered fusion optical fibers 1 described above are commonly located on the front side. In one or more embodiments, the plurality of fusion optical fibers 1 including the first fusion parts 3 are collectively placed in the fiber grooves 24 in such a manner. At this time, the fusion optical fibers 1 including the first fusion parts 3 are placed in the remaining fiber grooves 24 in which the fusion optical fibers 1 are not placed.

Then, when the fusion optical fibers 1 are placed in the even-numbered fiber grooves 24 as illustrated in FIG. 7A, an operator collectively handles the plurality of fusion optical fibers 1 including the second fusion parts 4. When the fusion optical fibers 1 are placed in the odd-numbered fiber grooves 24 as illustrated in FIG. 7B, the operator collectively handles the plurality of fusion optical fibers 1 including the first fusion parts 3. If the fusion optical fibers 1 are placed in order from the end of the fiber grooves 24, the operator needs to alternately handle the fusion optical fibers 1 including the second fusion parts 4 and the fusion optical fibers 1 including the first fusion parts 3, and thus placement work is inconvenient. In contrast, in one or more embodiments, the plurality of fusion optical fibers 1 in which the fusion parts 2 have a common position in the front-rear direction can be collectively handled, and thus work for placing the fusion optical fiber 1 in the fiber groove 24 is facilitated, and work efficiency improves.

Furthermore, in one or more embodiments, as illustrated in FIG. 7B, when the fusion optical fibers 1 are placed in the odd-numbered fiber grooves 24, the fusion optical fibers 1 (even-numbered fusion optical fibers 1) are in a state of being already placed in the even-numbered fiber grooves 24. In this state, there is a great height difference (unevenness) between the odd-numbered fiber groove 24 in which the fusion optical fiber 1 is to be placed next and the even-numbered fusion optical fibers 1 on both sides of the odd-numbered fiber groove 24. Thus, as illustrated in FIG. 7B, when the operator places each of the fusion optical fibers 1 in the odd-numbered fiber grooves 24, the operator may insert the end parts of the odd-numbered fusion optical fibers 1 between the fusion optical fibers 1 (even-numbered fusion optical fibers 1) that are already placed. Therefore, in one or more embodiments, work for alternately placing the fusion optical fibers 1 in the fiber grooves 24 (odd-numbered fiber grooves 24) is facilitated, and work efficiency further improves.

As illustrated in FIGS. 7A and 7B, in one or more embodiments, each of the plurality of fusion optical fibers 1 in which the fusion parts 2 have a common position in the front-rear direction (longitudinal direction of the fusion optical fiber 1) is placed in the fiber groove 24. In this way, when the fusion optical fibers 1 are each placed in the fiber groove 24, a positional relationship between the fusion part 2 and the substrate side-clearance part 22 is easily managed. Therefore, in the method for manufacturing the optical fiber array 10 according to one or more embodiments, the fusion optical fibers 1 can be easily placed on the substrate 20 in a state where the fusion parts 2 of two adjacent fusion optical fibers 1 are located in different positions from, each other in the longitudinal direction of the fusion optical fiber 1.

The fusion part 2 is disposed so as to be housed in the space formed by the substrate side-clearance part 22 by placing the fusion optical fiber 1 in the fiber groove 24 such that the fusion part 2 and the substrate side-clearance part 22 correspond to each other in a positional relationship. In this way, the part of the fusion part 2 expanding further than the outer diameter of the fusion optical fiber 1 does not contact the fiber groove 24, and the alignment precision of the fusion fibers 1 in the optical fiber array 10 can be increased.

After the fusion optical fibers 1 are disposed in the fiber grooves 24, the fixing member 30 is attached, and the fusion optical fibers 1, the substrate 20, and the fixing member 30 are bonded and fixed together. Note that the fusion optical fibers 1, the substrate 20, and the fixing member 30 are bonded and fixed together such that the fixing member 30 presses the fusion optical fibers 1 placed on the substrate 20. Note that the adhesive is injected from the substrate endface 21, and transmitted to the space between the fusion optical fibers 1, the substrate 20, and the fixing member 30 due to a capillary phenomenon. Lastly, the endfaces of the substrate endface 21 and the endfaces of the fusion optical fibers 1 are polished so as to be aligned with each other {Others}

As illustrated in FIG. 1B, in the optical fiber array 10 according to one or more embodiments described above, the substrate side-clearance part 22 and the fixing member side-clearance part 31 are formed in a recessed shape including wall surfaces and a bottom surface. However, the substrate side-clearance part 22 and the fixing member side-clearance part 31 may have a U groove shape and a V groove shape. As illustrated in FIGS. 3 and 4, the substrate side-clearance part 22 and the fixing member side-clearance part 31 have a shape extending in the substrate 20 to the left and right. However, the substrate side-clearance part 22 and the fixing member side-clearance part 31 may be formed only near a position of the fusion parts 2.

The example in which the thin core optical fiber 1A (D1) and the normal core optical fiber 1B (D1) having the same outer diameter are fusion-spliced together in the optical fiber array 10 according to the above-described embodiments is illustrated. However, optical fibers having outer diameters different from each other may be fused together. For example, the thin core optical fiber 1A having an outer diameter of D3 may be fused with the normal core optical fiber 1B having an outer diameter of D4 (≠D3). Note that, at this time, the fiber groove 24 is formed based on the outer diameter of each part of the thin core optical fiber 1A and the normal core optical fiber 1B to be placed. In other words, a part of the fiber groove 24 in which the thin core optical fiber 1A (D3) is placed is formed based on D3, and a part of the fiber groove 24 in which the normal core optical fiber 1B (D4) is placed is formed based on D4. In this way, when the fusion optical fiber 1 is disposed in the fiber groove 24, positions of central axes of the thin core optical fiber 1A and the normal core optical fiber 1B are located on the same line.

The optical fiber array 10 according to the above-described embodiments includes the two clearance parts that are the substrate side-first clearance part 25 and the substrate side-second clearance part 26. However, one larger clearance part that includes the two clearance parts may be formed. Note that, when one larger clearance part is formed, a greater amount of the adhesive is used, and thus a displacement of the fusion optical fiber 1 placed in the fiber groove 24 may increase due to contraction of the adhesive.

In the optical fiber array 10 according to the above-described embodiments, the plurality of fusion optical fibers 1 are placed on the substrate 20 such that positions of the fusion parts 2 in the front-rear direction are staggered in two stages (the first fusion part 3 and the second fusion part 4). However, the plurality of fusion optical fibers 1 may be placed on the substrate 20 such that positions of the fusion parts 2 in the front-rear direction are staggered in three or more stages.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE NUMERALS

1: (Fusion) optical fiber;
1A: (Thin core) optical fiber;
1B: (Normal core) optical fiber;
2: Fusion part;
3: First fusion part;
4: Second fusion part;
5: Adhesive;
10: Optical fiber array;
11: Fiber fixing substrate set;
20: Substrate;
21: Substrate endface;
22: Substrate side-clearance part;
23: Terrace part;
24: Fiber groove;
25: Substrate side-first clearance part;
26: Substrate side-second clearance part;
30: Fixing member;
31: Fixing member side-clearance part;
35: Fixing member side-first clearance part;
36: Fixing member side-second clearance part;
90: Optical connector;
100: Optical fiber array unit.

The invention claimed is:

1. An optical fiber array comprising:
optical fibers that each comprise a fusion part, wherein the optical fibers are aligned in a width direction of the optical fibers; and
a substrate on which fiber grooves are formed along a longitudinal direction of the optical fibers, wherein
the fiber grooves are aligned in the width direction,
the fusion parts are disposed on the substrate, and
the fusion parts of two adjacent optical fibers are disposed in different positions from each other in the longitudinal direction.

2. The optical fiber array according claim 1, further comprising:
a fixing member that sandwiches the optical fibers between the substrate and the fixing member, wherein the optical fibers are disposed in the fiber grooves.

3. The optical fiber array according to claim 2, wherein
the substrate comprises a clearance part over positions of the fusion parts, and
the clearance part has a recessed shape.

4. The optical fiber array according to claim 3, wherein
the clearance part comprises: a first clearance part and a second clearance part,
the first clearance part and the second clearance part are disposed in different positions in the longitudinal direction, and
the fiber grooves are formed between the first clearance part and the second clearance part.

5. The optical fiber array according to claim 1, wherein
the substrate comprises a clearance part over positions of the fusion parts, and
the clearance part has a recessed shape.

6. The optical fiber array according claim 5, wherein
the clearance part comprises: a first clearance part and a second clearance part,
the first clearance part and the second clearance part are disposed in different positions in the longitudinal direction, and
the fiber grooves are formed between the first clearance part and the second clearance part.

7. The optical fiber array according to claim 1, wherein the optical fibers are disposed on the substrate to cause positions of the fusion parts in the longitudinal direction to be staggered.

8. A fiber fixing substrate comprising:
fiber grooves that are formed along a longitudinal direction of an optical fiber and that are aligned in a width direction of the optical fiber, wherein the optical fiber comprises a fusion part and is disposed in one of the fiber grooves; and
a first clearance part and a second clearance part, wherein
the first clearance part has a recessed shape, and
the first clearance part and the second clearance part are disposed on the fusion part in different positions in the longitudinal direction.

9. A method for manufacturing an optical fiber array, comprising:
aligning optical fibers that each comprise a fusion part in a width direction of the optical fibers;
disposing the fusion parts on a substrate such that the fusion parts of two adjacent optical fibers are disposed in different positions from each other in a longitudinal direction of the optical fibers, wherein
fiber grooves are formed on the substrate along the longitudinal direction and aligned in the width direction.

10. The method for manufacturing an optical fiber array according to claim 9, further comprising:
alternately disposing, in some of the fiber grooves, the optical fibers in which the fusion parts have a common position in the longitudinal direction; and thereafter disposing, in the remaining fiber grooves, the optical fibers in which the fusion parts have another common position in the longitudinal direction.

* * * * *